(12) United States Patent
Wakabayashi

(10) Patent No.: US 12,391,140 B2
(45) Date of Patent: Aug. 19, 2025

(54) CHARGING MANAGEMENT SYSTEM

(71) Applicant: SUBARU CORPORATION, Tokyo (JP)

(72) Inventor: Kenta Wakabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 397 days.

(21) Appl. No.: 18/111,341

(22) Filed: Feb. 17, 2023

(65) Prior Publication Data

US 2023/0302940 A1 Sep. 28, 2023

(30) Foreign Application Priority Data

Feb. 25, 2022 (JP) ................................. 2022-028267

(51) Int. Cl.
| | |
|---|---|
| B60L 53/00 | (2019.01) |
| B60L 53/51 | (2019.01) |
| B60L 53/52 | (2019.01) |
| B60L 53/62 | (2019.01) |
| B60L 53/66 | (2019.01) |

(Continued)

(52) U.S. Cl.
CPC .............. B60L 53/62 (2019.02); B60L 53/51 (2019.02); B60L 53/52 (2019.02); B60L 53/66 (2019.02); B60L 58/12 (2019.02); G05B 19/042 (2013.01); *G05B 2219/2639* (2013.01)

(58) Field of Classification Search
CPC .......... G05B 19/042; G05B 2219/2639; G05B 2219/2637; B60L 53/62; B60L 53/51; B60L 53/52; B60L 53/66; B60L 58/12; B60L 53/63; B60L 53/64; B60L 53/67; B60L 53/68; B60L 2240/66; B60L 2240/665; B60L 2240/667; B60L 2240/72; B60L 2260/52; B60L 2260/54; B60L 53/10

See application file for complete search history.

(56) References Cited

U.S. PATENT DOCUMENTS

| | | | |
|---|---|---|---|
| 2012/0109402 A1* | 5/2012 | Shelton ................. | B60L 53/665 235/487 |
| 2018/0065494 A1* | 3/2018 | Mastrandrea .......... | G06Q 10/02 |
| 2021/0394580 A1* | 12/2021 | Chopard ................ | G08G 1/143 |

FOREIGN PATENT DOCUMENTS

JP 2013-234924 A 11/2013

* cited by examiner

*Primary Examiner* — Julio C. Gonzalez
(74) *Attorney, Agent, or Firm* — TROUTMAN PEPPER LOCKE LLP

(57) ABSTRACT

A charging management system comprising one or more processors configured to acquire weather forecast information indicating weather forecasts. The one or more processors are configured to estimate amounts of future decrease in a state of charge of an onboard battery in any vehicle. The one or more processors are configured to acquire user's orientation information indicating a user's orientation as to whether a user is oriented toward charging at a charging station using renewable energy as a source of power generation. The one or more processors are configured to derive, based on correlation information stored in a storage device, the acquired weather forecast information, the estimated amounts of decrease in the state of charge, and the user's orientation information, a charging plan indicating a combination of a charging timing and a charging place in a future such that a charging unit price is relatively reduced while reflecting the user's orientations.

6 Claims, 10 Drawing Sheets

(51) Int. Cl.
*B60L 58/12* (2019.01)
*G05B 19/042* (2006.01)

FIG. 2

| CHARGING STATION IDENTIFIER | RENEWABLE ENERGY/ NON-RENEWABLE ENERGY | POWER GENERATION TYPE | WEATHER INFORMATION ||| CHARGING UNIT PRICE ($/kWh) |
|---|---|---|---|---|---|---|
| | | | SOLAR RADIATION AMOUNT (W/m²) | WIND SPEED (m/s) | RAINFALL AMOUNT (mm/h) | |
| A | RENEWABLE ENERGY | SOLAR POWER | 10 | — | — | 0.15 |
| A | RENEWABLE ENERGY | SOLAR POWER | 20 | — | — | 0.1 |
| A | RENEWABLE ENERGY | SOLAR POWER | 30 | — | — | 0.08 |
| B | RENEWABLE ENERGY | WIND POWER | — | 0 | — | 0.3 |
| B | RENEWABLE ENERGY | WIND POWER | — | 2 | — | 0.15 |
| B | RENEWABLE ENERGY | WIND POWER | — | 5 | — | 0.1 |
| C | RENEWABLE ENERGY | HYDROELECTRIC POWER | — | — | 0 | 0.2 |
| C | RENEWABLE ENERGY | HYDROELECTRIC POWER | — | — | 2 | 0.2 |
| C | RENEWABLE ENERGY | HYDROELECTRIC POWER | — | — | 8 | 0.1 |
| D | NON-RENEWABLE ENERGY | THERMAL POWER | — | — | — | 0.09 |
| ... | ... | ... | ... | ... | ... | ... |

FIG. 3

| CHARGING STATION | USER'S ORIENTATION COEFFICIENT | |
| --- | --- | --- |
| | WITH ENVIRONMENTAL PREFERENCE | WITHOUT ENVIRONMENTAL PREFERENCE |
| RENEWABLE ENERGY | 2 | 1 |
| NON-RENEWABLE ENERGY | 1 | 2 |

FIG. 4

| CHARGING UNIT PRICE (P) ($/kWh) | CHARGING UNIT PRICE COEFFICIENT |
| --- | --- |
| $P < 0.1$ | 2 |
| $0.1 \leq P < 0.15$ | 1.6 |
| $0.15 \leq P < 0.2$ | 1.2 |
| $0.2 \leq P$ | 0.8 |

FIG. 5

| WEATHER INFORMATION | | DISASTER COEFFICIENT |
| --- | --- | --- |
| WIND SPEED (W) (m/s) | RAINFALL AMOUNT (R) (mm/h) | |
| $W < 10$ | $R < 10$ | 3 |
| $10 \leq W < 25$ | $10 \leq R < 20$ | 2 |
| $25 \leq W$ | $20 \leq R$ | 1 |

FIG. 6

| WEATHER FORECAST INFORMATION | PLAN DERIVATION PERIOD | | | | | | |
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOLAR RADIATION AMOUNT (W/m²) | 20 | 10 | 30 | 5 | 20 | 10 | 30 |
| WIND SPEED (m/s) | 0 | 2 | 5 | 2 | 15 | 2 | 0 |
| RAINFALL AMOUNT (mm/h) | 0 | 0 | 2 | 8 | 0 | 8 | 0 |

FIG. 7

| | PLAN DERIVATION PERIOD | | | | | | |
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| PURPOSE | COMMUTING | COMMUTING | COMMUTING | COMMUTING | COMMUTING | DAILY DRIVING | LEISURE |
| SOC DECREASE AMOUNT (%) | 20 | 20 | 20 | 20 | 20 | 10 | 30 |

FIG. 8

| ITEM | CHARGING STATION IDENTIFIER | PLAN DERIVATION PERIOD | | | | | | |
|---|---|---|---|---|---|---|---|---|
| | | OCTOBER 8 | OCTOBER 9 | OCTOBER 10 | OCTOBER 11 | OCTOBER 12 | OCTOBER 13 | OCTOBER 14 |
| CHARGING UNIT PRICE ($/kWh) | A | 0.1 | 0.15 | 0.08 | 0.2 | 0.1 | 0.15 | 0.1 |
| | B | 0.3 | 0.15 | 0.1 | 0.15 | 0.08 | 0.15 | 0.3 |
| | C | 0.2 | 0.2 | 0.2 | 0.1 | 0.2 | 0.09 | 0.2 |
| | D | 0.09 | 0.09 | 0.09 | 0.09 | 0.09 | 0.09 | 0.09 |
| CHARGING UNIT PRICE COEFFICIENT | A | 1.6 | 1.2 | 2 | 0.8 | 1.6 | 1.2 | 1.6 |
| | B | 0.8 | 1.2 | 1.6 | 1.2 | 2 | 1.2 | 0.8 |
| | C | 0.8 | 0.8 | 0.8 | 1.6 | 0.8 | 2 | 0.8 |
| | D | 2 | 2 | 2 | 2 | 2 | 2 | 2 |
| USER'S ORIENTATION COEFFICIENT | A | 2 | 2 | 2 | 2 | 2 | 2 | 2 |
| | B | 2 | 2 | 2 | 2 | 2 | 2 | 2 |
| | C | 2 | 2 | 2 | 2 | 2 | 2 | 2 |
| | D | 1 | 1 | 1 | 1 | 1 | 1 | 1 |
| DISASTER COEFFICIENT | A | 3 | 3 | 3 | 3 | 2 | 3 | 3 |
| | B | 3 | 3 | 3 | 3 | 2 | 3 | 3 |
| | C | 3 | 3 | 3 | 3 | 2 | 3 | 3 |
| | D | 3 | 3 | 3 | 3 | 2 | 3 | 3 |
| INDEX | A | 9.6 | 7.2 | 12 | 4.8 | 6.4 | 7.2 | 9.6 |
| | B | 4.8 | 7.2 | 9.6 | 7.2 | 8 | 7.2 | 4.8 |
| | C | 4.8 | 4.8 | 4.8 | 9.6 | 3.2 | 12 | 4.8 |
| | D | 6 | 6 | 6 | 6 | 4 | 6 | 6 |

FIG. 9

| | PLAN DERIVATION PERIOD ||||||| 
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOC TRANSITION (%) | 70 | 50 | 30 | 10 | 0 | 0 | 0 |

FIG. 10

| | PLAN DERIVATION PERIOD |||||||
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOC TRANSITION (%) | 70 | 50 | 30 | 70 | 50 | 40 | 10 |
| CHARGING AMOUNT (%) | | | 60 | | | | |
| MAXIMUM VALUE OF INDEX | | | 12 | | | | |
| CHARGING STATION | | | A | | | | |

FIG. 11

| | PLAN DERIVATION PERIOD |||||||
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOC TRANSITION (%) | 70 | 50 | 30 | 70 | 50 | 40 | 60 |
| CHARGING AMOUNT (%) | | | 60 | | | 50 | |
| MAXIMUM VALUE OF INDEX | | | 12 | | | 12 | |
| CHARGING STATION | | | A | | | C | |
| COMPREHENSIVE INDEX COMPONENT | | | 7.2 | | | 6 | |

COMPREHENSIVE INDEX COMPONENT = CHARGING AMOUNT × MAXIMUM VALUE OF INDEX/100

COMPREHENSIVE INDEX 13.2

FIG. 12

| | PLAN DERIVATION PERIOD | | | | | | |
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOC TRANSITION (%) | 70 | 50 | 70 | 50 | 30 | 20 | 0 |
| CHARGING AMOUNT (%) | | 40 | | | | | |
| MAXIMUM VALUE OF INDEX | | 7.2 | | | | | |
| CHARGING STATION | | A | | | | | |

FIG. 13

| | PLAN DERIVATION PERIOD | | | | | | |
|---|---|---|---|---|---|---|---|
| | OCTOBER 8 | OCTOBER 9 | OCTOBER 10 | OCTOBER 11 | OCTOBER 12 | OCTOBER 13 | OCTOBER 14 |
| SOC TRANSITION (%) | 70 | 50 | 70 | 50 | 30 | 20 | 60 |
| CHARGING AMOUNT (%) | | 40 | | | | 70 | |
| MAXIMUM VALUE OF INDEX | | 7.2 | | | | 12 | |
| CHARGING STATION | | A | | | | C | |
| COMPREHENSIVE INDEX COMPONENT | | 2.88 | | | | 8.4 | |

COMPREHENSIVE INDEX COMPONENT = CHARGING AMOUNT × MAXIMUM VALUE OF INDEX / 100

COMPREHENSIVE INDEX 11.28

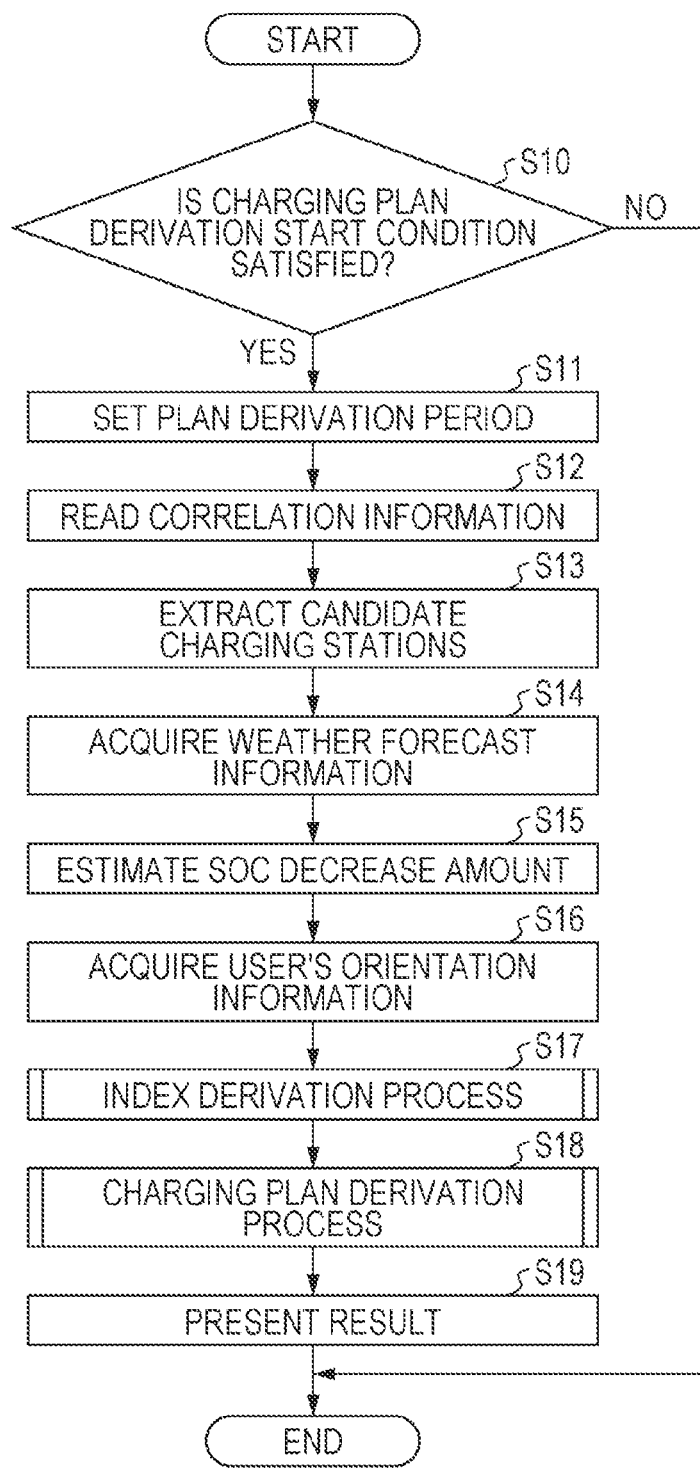

CHARGING MANAGEMENT SYSTEM

CROSS-REFERENCE TO RELATED APPLICATION

The present application claims priority from Japanese Patent Application No. 2022-028267 filed on Feb. 25, 2022, the entire contents of which are hereby incorporated by reference.

BACKGROUND

The disclosure relates to a charging management system that manages charging of an onboard battery.

For example, Japanese Unexamined Patent Application Publication No. 2013-234924 discloses an information processing apparatus to be applied to a vehicle and configured to provide information related to charging equipment. In this information processing apparatus, driving action records on the vehicle are accumulated and driving characteristic information is generated based on the accumulated driving action records. The information processing apparatus provides a driver who drives the vehicle with information related to charging equipment selected from a charging equipment group based on the driving characteristic information.

SUMMARY

An aspect of the disclosure provides a charging management system including a storage device and a control device. The storage device is configured to store correlation information on charging stations and pieces of weather information. The correlation information is information in which the charging stations, the pieces of weather information at timings at respective positions of the charging stations, and respective charging unit prices of the charging stations at the timings are associated with each other. The control device comprises one or more processors and one or more memories coupled to the one or more processors. In the correlation information, information as to whether a source of power generation in each of the charging stations is renewable energy is associated with each of the charging stations. The one or more processors are configured to acquire weather forecast information indicating weather forecasts, estimate amounts of future decrease in a state of charge of an onboard battery in a vehicle, acquire user's orientation information indicating one or more user's orientations including a user's orientation as to whether a user is oriented toward charging at a charging station using the renewable energy as the source of power generation, and derive, based on the correlation information stored in the storage device, the acquired weather forecast information, the estimated amounts of decrease in the state of charge, and the acquired user's orientation information, a charging plan indicating a combination of a charging timing and a charging place in a future such that a charging unit price is relatively reduced while reflecting the one or more user's orientations.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 is a diagram illustrating an example of correlation information;

FIG. 3 is a diagram illustrating an example of a user's orientation coefficient table;

FIG. 4 is a diagram illustrating an example of a charging unit price coefficient table;

FIG. 5 is a diagram illustrating an example of a disaster coefficient table;

FIG. 6 is a diagram illustrating an example of weather forecast information acquired by a weather forecast information acquirer;

FIG. 7 is a diagram illustrating an example of an SOC decrease amount derived by an SOC decrease amount estimator;

FIG. 8 is a diagram illustrating an example of derivation of an index;

FIG. 9 is a diagram illustrating an example of derivation of a charging plan;

FIG. 10 is a diagram illustrating the example of derivation of the charging plan;

FIG. 11 is a diagram illustrating the example of derivation of the charging plan;

FIG. 12 is a diagram illustrating another example of derivation of the charging plan;

FIG. 13 is a diagram illustrating the other example of derivation of the charging plan;

FIG. 14 is a flowchart illustrating an operation related to derivation of the charging plan by a control device;

DETAILED DESCRIPTION

When charging an onboard battery at a charging station, some drivers may be oriented toward charging at a charging station that supplies electric power generated from renewable energy, focusing on environment.

It is desirable to provide a charging management system that can provide charging based on the driver's orientation.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
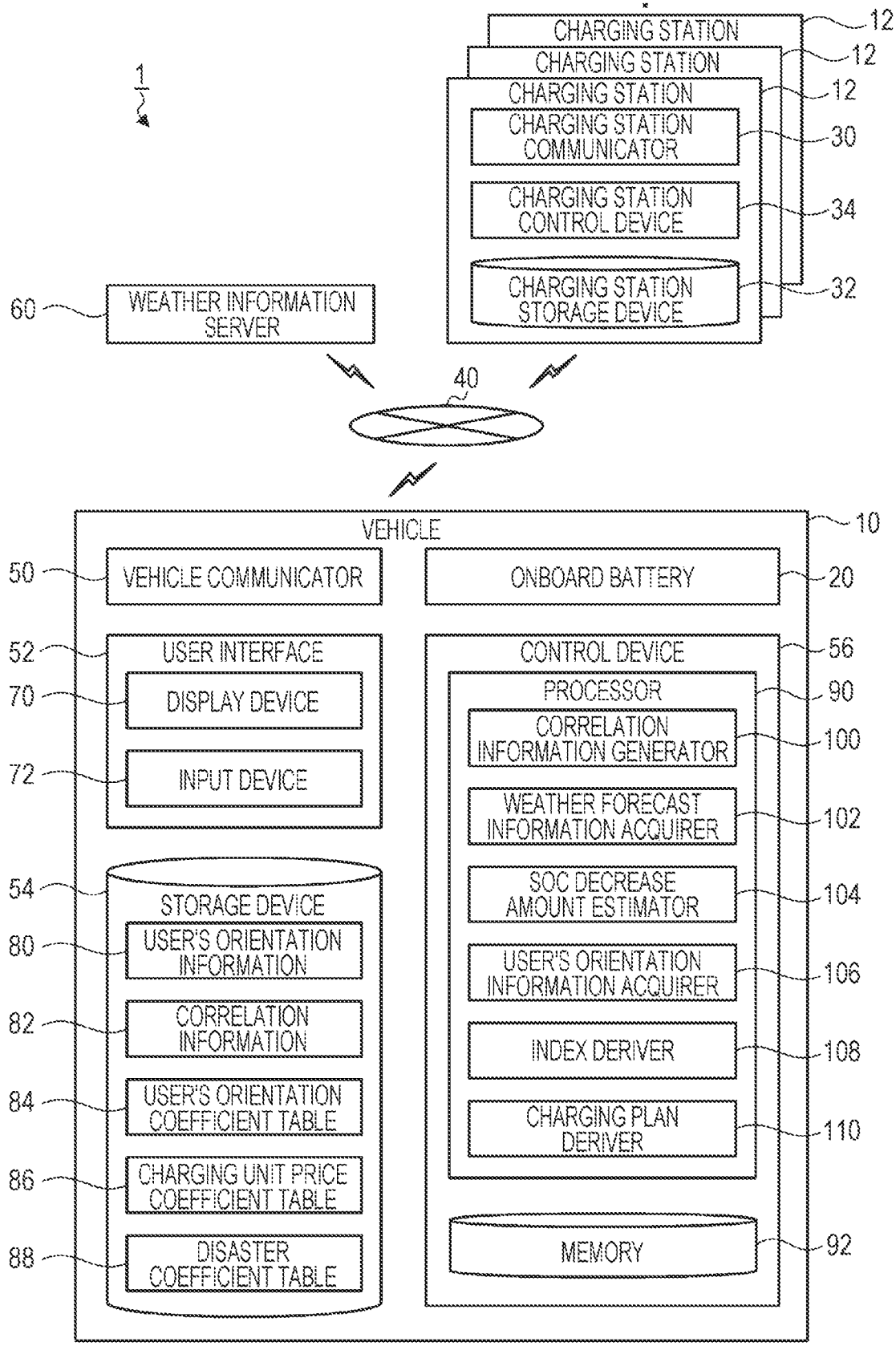
FIG. 1 is a schematic diagram illustrating the configuration of a charging management system according to an embodiment.

FIG. 1 is a schematic diagram illustrating the configuration of a charging management system 1 according to this embodiment. The charging management system 1 includes a vehicle 10 and charging stations 12.

Examples of the vehicle 10 include a battery electric vehicle and a hybrid electric vehicle including a motor as a traveling drive source. The vehicle 10 includes an onboard battery 20. Examples of the onboard battery 20 include a lithium ion battery that is a chargeable and dischargeable secondary battery. The onboard battery 20 supplies electric power to the drive source motor.

Each charging station 12 is an example of an external power supply outside the vehicle 10. The charging stations 12 are installed at various places. For example, the charging station 12 can supply electric power to the vehicle 10 by coupling a charging connector (not illustrated) to the vehicle 10. For example, the vehicle 10 can receive the electric power from the external power supply by coupling the charging connector to a charging port (not illustrated). The onboard battery 20 is charged with the electric power supplied to the vehicle 10 from its outside.

For example, the charging stations 12 are categorized into renewable energy charging stations and non-renewable energy charging stations. The renewable energy charging station 12 supplies the vehicle 10 with electric power generated by using renewable energy. In other words, the renewable energy charging station 12 uses renewable energy as a source of power generation.

The renewable energy is expected to be replenished steadily even if it is consumed. The renewable energy may be natural energy such as solar energy, wind energy, water energy, geothermal energy, or tidal energy. The renewable energy is not limited to the natural energy, and may include any energy such as biomass energy that is not a natural phenomenon but is expected to be replenished steadily even if it is consumed.

The renewable energy charging station generates electric power by using the renewable energy in a region where the charging station is installed. For example, the solar energy charging station 12 is installed in a region where a year-round average of solar radiation amounts is relatively large, and generates electric power by using solar energy radiated in this region. The wind energy charging station 12 is installed in a region where a year-round average of wind speeds is relatively high, and generates electric power by using wind energy in this region. The water energy charging station 12 is installed in a region abundant in water resources, and generates electric power by using a water potential energy in this region.

For example, the power generation amount of the renewable energy charging station may become unstable due to temporal variations in the solar radiation amount, wind speed, or water amount. The renewable energy charging station may have a battery that stores generated electric power to stably supply the electric power to the vehicle 10.

The renewable energy charging station is not limited to the charging station that supplies the vehicle 10 with electric power entirely from the renewable energy. For example, there may be a charging station that supplies the vehicle 10 with a mixture of electric power from distributed power supplies using solar energy and electric power from a power grid. The electric power from the power grid includes a large amount of electric power generated from non-renewable energy described later. If the supplied electric power includes electric power from the non-renewable energy but includes electric power from the renewable energy at a predetermined ratio or more, such as 50% or more, the charging station may be regarded as the renewable energy charging station. For example, if the ratio of the amount of electric power supplied to the vehicle 10 from the distributed power supplies using solar energy in the charging station to the total amount of electric power supplied to the vehicle 10 from the charging station is the predetermined ratio or more, the charging station may be regarded as the renewable energy charging station.

The non-renewable energy charging station 12 supplies the vehicle 10 with electric power obtained by using energy other than the renewable energy. In other words, the source of power generation of the non-renewable energy charging station 12 is not the renewable energy.

The non-renewable energy is obtained from combustion of fossil resources such as coal, petroleum, or gasoline.

For example, the non-renewable energy charging station supplies the vehicle 10 with electric power generated by itself by consuming the fossil resource. A charging station 12 that supplies the vehicle 10 with electric power from the power grid including a large amount of electric power from the non-renewable energy may be categorized as the non-renewable energy charging station.

If the ratio of the renewable energy in the supplied electric power is less than the predetermined ratio, such as less than 50%, the charging station may be regarded as the non-renewable energy charging station.

Each charging station 12 includes a charging station communicator 30, a charging station storage device 32, and a charging station control device 34. The charging station communicator 30 can communicate with the vehicle 10 via a communication network 40 such as the Internet.

The charging station storage device 32 includes non-volatile storage elements. The non-volatile storage elements may include an electrically readable and writable non-volatile storage element such as a flash memory. For example, the charging station storage device 32 stores information for distinguishing the charging station 12 having the charging station storage device 32 as the renewable energy charging station or the non-renewable energy charging station. If the charging station 12 is the renewable energy charging station, the charging station storage device 32 stores information for distinguishing the type of the renewable energy of the charging station 12.

In a renewable energy charging station using multiple types of renewable energy as the source of electric power, renewable energy serving as the source at the highest ratio may be set as the type of the renewable energy of this renewable energy charging station.

The charging station control device 34 includes a processor and a memory (not illustrated). The charging station control device 34 controls various parts of the charging station 12. The charging station control device 34 can transmit, to the vehicle 10 via the charging station communicator 30, information to be used for distinguishing the charging station 12 as the renewable energy charging station and stored in the charging station storage device 32.

A driver of the vehicle 10 can charge the onboard battery 20 at any charging station 12 among the charging stations 12 at various places.

Some drivers may prefer charging at the renewable energy charging station to charging at the non-renewable energy charging station, and some other drivers may have no preference about charging at the renewable energy charging station. Thus, the drivers have different orientations about the charging.

The occupant of the vehicle 10, such as the driver, is hereinafter referred to as "user" of the charging management system 1 of this embodiment. Whether the user is oriented toward charging at the charging station using the renewable energy as the source of power generation, in other words, the renewable energy charging station, is hereinafter referred to as "user's orientation".

The charging management system 1 of this embodiment derives a future charging plan in which the charging unit price is relatively reduced while reflecting the user's orientation. The charging plan indicates a combination of a charging timing and a charging place in the future. For example, the charging management system 1 derives a charging plan indicating recommendation for charging at a specific charging station 12 on a specific day within a period corresponding to one week from a current time. By presenting the derived charging plan to the user, the user can carry out charging at an appropriate charging station 12 that matches his/her orientation at an efficient timing. The vehicle 10 that implements the charging management system 1 is described in detail below.

The vehicle 10 includes a vehicle communicator 50, a user interface 52, a storage device 54, and a control device 56 in addition to the onboard battery 20. The vehicle communicator 50 can communicate with each charging station 12 via the communication network 40. The vehicle communicator 50 can also communicate with a weather information server 60 via the communication network 40.

The weather information server 60 manages weather information of each place. For example, the weather information server 60 collects and accumulates current weather information of each place. The weather information server 60 makes a weather forecast in the future by analyzing the accumulated past weather information, and generates weather forecast information indicating the weather forecast. The weather information server 60 can provide the current weather information and the weather forecast information of each place to the vehicle 10 via the communication network 40.

For example, the weather information and the weather forecast information include information on weather, a solar radiation amount, a wind speed, and a rainfall amount at each place. For example, the solar radiation amount, the wind speed, and the rainfall amount may be accumulated at every predetermined time interval such as one hour.

For example, the user interface 52 of the vehicle 10 includes a display device 70 such as a liquid crystal display or an organic EL display. For example, the display device 70 displays various images or various types of information. In addition to the display device 70, the user interface 52 may include an output device such as a loudspeaker that presents various types of information to the user. The user interface 52 may include an input device such as a touch panel that receives the user's operation.

The storage device 54 includes non-volatile storage elements. The non-volatile storage elements may include an electrically readable and writable non-volatile storage element such as a flash memory. The storage device 54 stores user's orientation information 80, correlation information 82, a user's orientation coefficient table 84, a charging unit price coefficient table 86, and a disaster coefficient table 88.

The user's orientation information 80 indicates a user's orientation as to whether the user is oriented toward charging at the renewable energy charging station. The case where the user is oriented toward charging at the renewable energy charging station may hereinafter be referred to as "with environmental preference". The case where the user has no preference about the type of the charging station 12 may hereinafter be referred to as "without environmental preference". The user inputs information on either "with environmental preference" or "without environmental preference" in advance through an input device 72. Thus, an input result about either "with environmental preference" or "without environmental preference" is prestored in the storage device 54 as the user's orientation information 80.

The user's orientation information 80 is not limited to the information stored by the user's input. For example, the storage device 54 may accumulate the type of the charging station 12 every time charging is performed at the charging station 12, and the control device 56 may generate the user's orientation information 80 based on the ratio of the types of the charging stations 12 used in the past.

In the correlation information 82, a charging station 12, weather information at any timing at the position of the charging station 12, and a charging unit price of the charging station 12 at any timing are associated with each other for each of the charging stations 12 and multiple pieces of weather information. In the correlation information 82, the charging unit price is associated with each combination of one charging station 12 and a value of one of the multiple pieces of weather information.

FIG. 2 is a diagram illustrating an example of the correlation information 82. In FIG. 2, items and numerical values are examples that are not limitative.

A charging station identifier is information for identifying the charging station 12. A power generation type indicates the source energy for generating electric power to be supplied by the charging station 12. In the correlation information, the pieces of weather information are, for example, a solar radiation amount, a wind speed, and a rainfall amount. The solar radiation amount is an amount of radiant energy to be received in a unit area from the sun during a unit period. The wind speed is a movement speed of air as wind. The rainfall amount is an amount of rainfall during a unit period. A charging unit price is a price of electric power to be supplied by the charging station 12 per unit electric energy.

In the example of FIG. 2, a charging station "A" is a renewable energy charging station using solar energy. In the charging station "A", the charging unit price is set in association with the solar radiation amount, and is determined for each value of the solar radiation amount.

A charging station "B" is a renewable energy charging station using wind energy. In the charging station "B", the charging unit price is set in association with the wind speed, and is determined for each value of the wind speed.

A charging station "C" is a renewable energy charging station using water energy. In the charging station "C", the charging unit price is set in association with the rainfall amount, and is determined for each value of the rainfall amount.

A charging station "D" is a non-renewable energy charging station using thermal energy. In the charging station "D", a predetermined charging unit price is set irrespective of the solar radiation amount, the wind speed, and the rainfall amount.

The charging management system 1 uses the following "index" to derive a charging plan. Although details are described later, the control device 56 derives the "index" for each charging station 12 and each day within a predetermined future period. The control device 56 derives a charging plan at a high value of the derived "index".

The "index" is a multiplication of "user's orientation coefficient", "charging unit price coefficient", and "disaster coefficient" as in Expression (1).

$$\text{"Index"}=\text{"user's orientation coefficient"}\times\text{"charging unit price coefficient"}\times\text{"disaster coefficient"} \quad (1)$$

The "index" includes at least the user's orientation coefficient and the charging unit price coefficient, and the disaster coefficient may be omitted.

The user's orientation coefficient indicates a weight to be assigned to a user's orientation. The user's orientation coefficient is derived based on the user's orientation information 80 and the user's orientation coefficient table 84 stored in the storage device 54.

FIG. 3 is a diagram illustrating an example of the user's orientation coefficient table 84. In FIG. 3, numerical values are examples that are not limitative.

In the user's orientation coefficient table 84, the user's orientation coefficient is set for each combination of the type of the charging station 12 and the user's orientation.

When the user's orientation is "with environmental preference" in the example of FIG. 3, a user's orientation coefficient "2" is set for the renewable energy charging station 12, and a user's orientation coefficient "1" is set for the non-renewable energy charging station 12. When the user's orientation is "without environmental preference", a user's orientation coefficient "1" is set for the renewable energy charging station 12, and a user's orientation coefficient "2" is set for the non-renewable energy charging station. In the user's orientation coefficient table 84, the charging station 12 that matches the user's orientation has a larger user's orientation coefficient than the other charging stations 12.

The control device 56 acquires the user's orientation information 80 from the storage device 54, and derives the user's orientation coefficient based on the user's orientation information 80 by referring to the user's orientation coefficient table 84. For example, when the user's orientation information 80 indicates "with environmental preference" and the charging station 12 whose "index" will be derived is the renewable energy charging station 12, the user's orientation coefficient "2" is derived by referring to the user's orientation coefficient table 84.

In the case of "with environmental preference" in the example of FIG. 3, the user's orientation coefficients have a relationship of "renewable energy:non-renewable energy=2:1". The user's orientation coefficients are not limited to this example, and may have any ratio such as "renewable energy:non-renewable energy=1:0" or "renewable energy:non-renewable energy=7:3".

The charging unit price coefficient indicates a weight to be assigned to the charging unit price of the charging station 12. As described later, the control device 56 acquires weather forecast information from the weather information server 60, and estimates the charging unit price of the charging station 12 based on the weather forecast information and the correlation information 82. The charging unit price coefficient is derived based on the estimated charging unit price and the charging unit price coefficient table 86.

FIG. 4 is a diagram illustrating an example of the charging unit price coefficient table 86. In FIG. 4, numerical values are examples that are not limitative.

In the charging unit price coefficient table 86, the charging unit price of the charging station 12 and the charging unit price coefficient are associated with each other.

When the charging unit price is less than 0.1 in the example of FIG. 4, a charging unit price coefficient "2" is set. When the charging unit price is 0.1 or more and less than 0.15, a charging unit price coefficient "1.6" is set. When the charging unit price is 0.15 or more and less than 0.2, a charging unit price coefficient "1.2" is set. When the charging unit price is 0.2 or more, a charging unit price coefficient "0.8" is set. In the charging unit price coefficient table 86, the charging unit price coefficient increases as the charging unit price decreases.

The control device 56 derives the charging unit price coefficient based on the estimated charging unit price by referring to the charging unit price coefficient table 86. For example, when the estimated charging unit price is "0.1", the charging unit price coefficient "1.6" is derived.

The disaster coefficient indicates a weight to be assigned to a risk level of disaster at the position of the charging station 12. Examples of the disaster include, but not limited to, typhoon. The control device 56 acquires weather forecast information around the charging station 12 from the weather information server 60. The control device 56 derives the disaster coefficient based on the weather forecast information and the disaster coefficient table 88.

FIG. 5 is a diagram illustrating an example of the disaster coefficient table 88. In FIG. 5, numerical values are examples that are not limitative.

In the disaster coefficient table 88, weather information and the disaster coefficient are associated with each other. For example, in the disaster coefficient table 88, the wind speed in the weather information is associated with the disaster coefficient, and the rainfall amount in the weather information is associated with the disaster coefficient.

When the wind speed is less than 10 in the example of FIG. 5, a disaster coefficient "3" is set. When the wind speed is 10 or more and less than 25, a disaster coefficient "2" is set. When the wind speed is 25 or more, a disaster coefficient "1" is set.

When the rainfall amount is less than 10, a disaster coefficient "3" is set. When the rainfall amount is 10 or more and less than 20, a disaster coefficient "2" is set. When the rainfall amount is 20 or more, a disaster coefficient "1" is set.

In the disaster coefficient table 88, the disaster coefficient increases as the disaster risk decreases.

The control device 56 derives the disaster coefficient by referring to the disaster coefficient table 88 with the acquired weather forecast information regarded as the weather information in the disaster coefficient table 88. For example, when the wind speed is less than 10 and the rainfall amount is less than 10, the disaster coefficient "3" is derived.

For example, when the wind speed is less than 10 and the rainfall amount is 10 or more and less than 20, the disaster coefficient "2" is derived. Therefore, when the wind speed and the rainfall amount are associated with different disaster coefficients, a smaller disaster coefficient is derived. If priority levels are set for the wind speed and the rainfall amount and the disaster coefficient based on the wind speed differs from the disaster coefficient based on the rainfall amount, a disaster coefficient with a higher priority level may be derived. The disaster coefficient may be associated with either one of the wind speed and the rainfall amount.

The control device 56 derives the "index" by multiplying the user's orientation coefficient, the charging unit price coefficient, and the disaster coefficient.

The "index" may be obtained in such a manner that the value obtained by multiplying the user's orientation coefficient, the charging unit price coefficient, and the disaster coefficient is multiplied by a charging period coefficient. The charging period decreases as a charging current increases. Therefore, the charging period coefficient is set based on the charging current of the charging station 12. The charging period coefficient increases as the charging period decreases, in other words, the charging current increases. With the "index" including the charging period coefficient, a more effective charging plan can be derived.

Referring back to FIG. 1, the control device 56 includes one or more processors 90 and one or more memories 92 coupled to the processors 90. The memory 92 includes a ROM that stores programs and the like, and a RAM serving as a working area. The processor 90 controls various parts of the vehicle 10 in cooperation with the programs in the memory 92.

The processor 90 that executes the program functions as a correlation information generator 100, a weather forecast information acquirer 102, an SOC decrease amount estimator 104, a user's orientation information acquirer 106, an index deriver 108, and a charging plan deriver 110. A state of charge (SOC) is a charging ratio represented by percentage of a current charge level to a full charge level in the onboard battery 20.

The correlation information generator 100 generates the correlation information 82 as follows, and stores the generated correlation information 82 in the storage device 54.

The correlation information generator 100 acquires, from a navigation device or the like, a passage route along which the vehicle 10 has actually passed. The correlation information generator 100 extracts charging stations 12 based on the passage route.

For example, the correlation information generator 100 determines whether there is a passage route along which the vehicle 10 has passed a predetermined number of times or more during a predetermined period. The predetermined period and the predetermined number of times may be set to any values. When there is a passage route along which the vehicle 10 has passed the predetermined number of times or more during the predetermined period, the correlation information generator 100 extracts charging stations 12 around the passage route. When there is no passage route along which the vehicle 10 has passed the predetermined number of times or more during the predetermined period, the correlation information generator 100 extracts charging stations 12 around the user's home.

The correlation information generator 100 communicates with the extracted charging stations 12 via the vehicle communicator 50 to acquire charging unit prices of the charging stations 12 at a specific timing. The specific timing may be any timing such as noon on a previous day.

The correlation information generator 100 communicates with the weather information server 60 via the vehicle communicator 50 to acquire pieces of weather information at the specific timing at the positions of the charging stations 12. The correlation information generator 100 acquires the charging unit prices and the pieces of weather information at various specific timings. The correlation information generator 100 acquires the charging unit prices and the pieces of weather information for the extracted charging stations 12, respectively.

The correlation information generator 100 generates the correlation information 82 by associating the extracted charging stations 12, the acquired charging unit prices at the specific timing, and the acquired pieces of weather information at the specific timing, respectively. In this manner, the correlation information 82 is generated as in FIG. 2. The correlation information generator 100 stores the generated correlation information 82 in the storage device 54.

The charging stations 12 extracted by the correlation information generator 100 have a strong possibility of being used by the user. Therefore, those charging stations 12 may be candidates for charging stations 12 to be presented in a charging plan to be derived later. Those charging stations 12 may be referred to as "candidate charging stations 12".

When deriving the charging plan, the weather forecast information acquirer 102 communicates with the weather information server 60 via the vehicle communicator 50 to acquire weather forecast information during a predetermined period in a weather forecast target area including the positions of the candidate charging stations 12. The predetermined period corresponds to a period for derivation of the charging plan described later. The predetermined period, that is, the period for derivation of the charging plan may hereinafter be referred to as "plan derivation period". For example, the plan derivation period is a period corresponding to one week from the next day, but may be any period without being limited to this example.

FIG. 6 is a diagram illustrating an example of the weather forecast information acquired by the weather forecast information acquirer 102. In the example of FIG. 6, the next day is October 8, and the plan derivation period is October 8 to October 14. In FIG. 6, the days and numerical values are examples that are not limitative.

In the example of FIG. 6, the weather forecast information acquirer 102 acquires, as the weather forecast information, predicted values of the solar radiation amount, predicted values of the wind speed, and predicted values of the rainfall amount on October 8 to October 14. For example, the predicted values of the solar radiation amount are "20", "10", "30", "5", "20", "10", and "30" in order from October 8. The predicted values of the wind speed are "0", "2", "5", "2", "15", "2", and "0" in order from October 8. The predicted values of the rainfall amount are "0", "0", "2", "8", "0", "8", and "0" in order from October 8. As described later, those pieces of weather forecast information are used for estimating future charging unit prices of the candidate charging stations 12.

When deriving the charging plan, the SOC decrease amount estimator 104 estimates an amount of future decrease in the SOC of the onboard battery 20. The amount of decrease in the SOC may hereinafter be referred to as "SOC decrease amount".

For example, the SOC decrease amount estimator 104 derives an SOC decrease amount every day and accumulates the SOC decrease amount in the storage device 54. The SOC decrease amount estimator 104 analyzes the accumulated daily SOC decrease amounts, and estimates a future SOC decrease amount. The SOC decrease amount estimator 104 estimates daily SOC decrease amounts within the plan derivation period.

FIG. 7 is a diagram illustrating an example of the SOC decrease amount derived by the SOC decrease amount estimator 104. In the example of FIG. 7, the next day is October 8, and the plan derivation period is October 8 to October 14. In FIG. 7, the days and numerical values are examples that are not limitative.

In the example of FIG. 7, the SOC decrease amount estimator 104 estimates SOC decrease amounts on October 8 to October 14. As a result of the estimation, the SOC decrease amounts are, for example, "20", "20", "20", "20", "20", "10", and "30" in order from October 8. As described later, those SOC decrease amounts are used for deriving the charging plan.

The SOC decrease amount estimator 104 may estimate purposes of use of the vehicle 10 on the days of the estimation of the SOC decrease amounts. In the example of FIG. 7, the purposes of use of the vehicle 10 are "commuting", "commuting", "commuting", "commuting", "commuting", "daily driving", and "leisure" in order from October 8. The SOC decrease amounts vary depending on the purposes.

The user's orientation information acquirer 106 acquires the user's orientation information 80. For example, the user's orientation information acquirer 106 acquires the user's orientation information 80 in advance by the user's input through the input device 72, and stores the acquired user's orientation information 80 in the storage device 54.

The user's orientation information acquirer 106 may acquire the type of the charging station 12 every time charging is performed at the charging station 12, and derive the user's orientation information 80 based on the ratio of the types of the charging stations 12 used in the past.

The index deriver 108 derives the "index" to derive the charging plan. The derivation of the "index" is described with reference to FIG. 8.

FIG. 8 is a diagram illustrating an example of the derivation of the index. In the example of FIG. 8, the next day is October 8, and the plan derivation period is October 8 to October 14. In FIG. 8, the days and numerical values are examples that are not limitative.

The index deriver 108 derives a charging unit price based on the weather forecast information acquired by the weather forecast information acquirer 102 and the correlation information 82 stored in the storage device 54. The index deriver 108 derives the charging unit price for each day within the plan derivation period and each candidate charging station 12.

For example, the charging unit price of the charging station "A" on October 8 is derived as follows. Referring to the correlation information 82 of FIG. 2, the charging station "A" is a renewable energy charging station using solar energy. As illustrated in FIG. 6, the solar radiation amount in the weather forecast information on October 8 is "20". The solar radiation amount "20" in the weather forecast information corresponds to a solar radiation amount "20" in the weather information in the correlation information 82 of FIG. 2. As illustrated in FIG. 2, the charging unit price of the charging station "A" associated with the solar radiation amount "20" is "0.1". Therefore, the charging unit price "0.1" is derived for the charging station "A" on October 8 as illustrated in FIG. 8.

The charging unit prices on the other days within the plan derivation period and of the other candidate charging stations 12 are derived in the same way as in the derivation of the charging unit price of the charging station "A" on October 8.

The index deriver 108 derives a charging unit price coefficient based on the charging unit price and the charging unit price coefficient table 86. The index deriver 108 derives the charging unit price coefficient for each day within the plan derivation period and each candidate charging station 12.

For example, the charging unit price coefficient of the charging station "A" on October 8 is derived as follows. As described above, the charging unit price of the charging station "A" on October 8 is "0.1". In the charging unit price coefficient table 86 of FIG. 4, the charging unit price coefficient is "1.6" in the case of the charging unit price "0.1". Therefore, the charging unit price coefficient "1.6" is derived for the charging station "A" on October 8 as illustrated in FIG. 8.

The charging unit price coefficients on the other days within the plan derivation period and of the other candidate charging stations 12 are derived in the same way as in the derivation of the charging unit price coefficient of the charging station "A" on October 8.

The index deriver 108 derives a user's orientation coefficient based on the correlation information 82, the user's orientation information 80, and the user's orientation coefficient table 84. The index deriver 108 derives the user's orientation coefficient for each day within the plan derivation period and each candidate charging station 12.

For example, the user's orientation coefficient of the charging station "A" on October 8 is derived as follows. For example, user's orientation information 80 indicating "with environmental preference" is stored in the storage device 54. Referring to the correlation information 82 of FIG. 2, the charging station "A" is a renewable energy charging station using solar energy as described above. In the user's orientation coefficient table 84 of FIG. 3, the user's orientation coefficient is "2" when the user's orientation information 80 indicates "with environmental preference" and the charging station is the renewable energy charging station. Therefore, the user's orientation coefficient "2" is derived for the charging station "A" on October 8 as illustrated in FIG. 8.

The user's orientation coefficients on the other days within the plan derivation period and of the other candidate charging stations 12 are derived in the same way as in the derivation of the user's orientation coefficient of the charging station "A" on October 8.

The index deriver 108 derives a disaster coefficient based on the weather forecast information and the disaster coefficient table 88. The index deriver 108 derives the disaster coefficient for each day within the plan derivation period and each candidate charging station 12.

For example, the disaster coefficient of the charging station "A" on October 8 is derived as follows. In the weather forecast information on October 8 in FIG. 6, the wind speed is "0" and the rainfall amount is "0". The wind speed "0" in the weather forecast information corresponds to the wind speed "less than 10" in the weather information in the disaster coefficient table 88 of FIG. 5. The rainfall amount "0" in the weather forecast information corresponds to the rainfall amount "less than 10" in the weather information in the disaster coefficient table 88 of FIG. 5. As illustrated in FIG. 5, the disaster coefficient is "3" when the wind speed is "less than 10" and the rainfall amount is "less than 10". Therefore, the disaster coefficient "3" is derived for the charging station "A" on October 8 as illustrated in FIG. 8.

The disaster coefficients on the other days within the plan derivation period and of the other candidate charging stations 12 are derived in the same way as in the derivation of the disaster coefficient of the charging station "A" on October 8.

The index deriver 108 derives an "index" by multiplying the user's orientation coefficient, the charging unit price coefficient, and the disaster coefficient. The index deriver 108 derives the "index" for each day within the plan derivation period and each candidate charging station 12.

For example, the "index" of the charging station "A" on October 8 is derived as follows. In the charging station "A" on October 8 in FIG. 8, the user's orientation coefficient is "2", the charging unit price coefficient is "1.6", and the disaster coefficient is "3". The user's orientation coefficient "2", the charging unit price coefficient "1.6", and the disaster coefficient "3" are multiplied together to derive an "index" "9.6" (2×1.6×3=9.6) as illustrated in FIG. 8.

The "indices" on the other days within the plan derivation period and of the other candidate charging stations 12 are derived in the same way as in the derivation of the "index" of the charging station "A" on October 8.

A higher value of the "index" indicates that the user's orientation is reflected more greatly, the charging unit price is relatively low, and the disaster risk is low. Therefore, it is appropriate to perform charging under the condition that the value of the "index" is high.

The charging plan deriver 110 derives a charging plan based on the "indices" derived by the index deriver 108. The derivation of the charging plan is described with reference to FIG. 9 to FIG. 13.

FIG. 9 to FIG. 11 are diagrams illustrating an example of the derivation of the charging plan. FIG. 12 and FIG. 13 are diagrams illustrating another example of the derivation of the charging plan.

In the charging plan, it is assumed that charging is performed when the SOC of the onboard battery 20 is in a range of 20 or more and 50 or less. In the charging plan, it is assumed that charging is performed until the SOC of the onboard battery 20 reaches 90. It is assumed that the current day is a day before October 8 and the current SOC of the onboard battery 20 is 90.

As illustrated in FIG. 9, the charging plan deriver 110 estimates an SOC transition in the plan derivation period based on the SOC decrease amounts derived by the SOC decrease amount estimator 104.

For example, the SOC decrease amounts on October 8 to October 12 are "20" as illustrated in FIG. 7. As illustrated in FIG. 9, the SOC on October 8 is estimated to be "70" by decreasing from "90" by "20". The SOC on October 9 is estimated to be "50" by decreasing from "70" by "20". The SOC on October 10 is estimated to be "30" by decreasing from "50" by "20". The SOC on October 11 is estimated to be "10" by decreasing from "30" by "20". On October 12, the SOC decreases from "10" by "20" into a negative value. When the value is negative, the SOC is estimated to be "0".

When the SOC transition is estimated as illustrated in FIG. 9, the SOC "50" on October 9 and the SOC "30" on October 10 are in the range of 20 or more and 50 or less as indicated by thick boxes in FIG. 9. Thus, the charging plan deriver 110 sets October 9 or October 10 as a charging day.

For example, when October 10 is determined as the charging day, charging is performed on October 10 by a charging amount corresponding to an SOC "60" until the SOC changes from "30" to "90" (90−30=60) as illustrated in FIG. 10.

As illustrated in FIG. 8, the "indices" on October 10 are "12", "9.6", "4.8", and "6". Since the maximum value of the "index" is "12", FIG. 10 illustrates "12" as the maximum value of the "index" on October 10. As illustrated in FIG. 8, the charging station 12 associated with the maximum value "12" of the "index" on October 10 is the charging station "A". Therefore, FIG. 10 illustrates the charging station "A" on October 10. That is, the charging plan deriver 110 determines the charging day as "October 10", and identifies the charging station "A" associated with the charging day.

When charging is performed on October 10, the SOC after the charging on October 10 is "90". Thus, the SOC transition after the charging on October 10 is updated as illustrated in FIG. 10.

For example, the SOC decrease amounts on October 11 and October 12 are "20", the SOC decrease amount on October 13 is "10", and the SOC decrease amount on October 14 is "30" as illustrated in FIG. 7. As illustrated in FIG. 10, the SOC on October 11 is estimated to be "70" by decreasing from "90" by "20". The SOC on October 12 is estimated to be "50" by decreasing from "70" by "20". The SOC on October 13 is estimated to be "40" by decreasing from "50" by "10". The SOC on October 14 is estimated to be "10" by decreasing from "40" by "30".

When the SOC transition is updated as illustrated in FIG. 10, the SOC "50" on October 12 and the SOC "40" on October 13 are in the range of 20 or more and 50 or less as indicated by thick boxes in FIG. 10. Thus, the charging plan deriver 110 sets October 12 or October 13 as the charging day.

For example, when October 13 is determined as the charging day, charging is performed on October 13 by a charging amount corresponding to an SOC "50" until the SOC changes from "40" to "90" (90−40=50) as illustrated in FIG. 11.

As illustrated in FIG. 8, the "indices" on October 13 are "7.2", "7.2", "12", and "6". Since the maximum value of the "index" is "12", FIG. 11 illustrates "12" as the maximum value of the "index" on October 13. As illustrated in FIG. 8, the charging station 12 associated with the maximum value "12" of the "index" on October 13 is the charging station "C". Therefore, FIG. 11 illustrates the charging station "C" on October 13. That is, the charging plan deriver 110 further determines the charging day as "October 13", and identifies the charging station "C" associated with the charging day.

When charging is performed on October 13, the SOC after the charging on October 13 is "90". Thus, the SOC transition after the charging on October 13 is updated as illustrated in FIG. 11.

For example, the SOC decrease amount on October 14 is "30" as illustrated in FIG. 7. As illustrated in FIG. 11, the SOC on October 14 is estimated to be "60" by decreasing from "90" by "30".

In the example of FIG. 11, the day that falls within the plan derivation period and is subsequent to October 13 determined as the latest charging day is not the day when the SOC is in the range of 20 or more and 50 or less. Thus, the charging plan deriver 110 no longer determines the charging day.

The charging plan deriver 110 creates a charging plan to perform charging at the charging station "A" on October 10 and at the charging station "C" on October 13.

After the charging plan has been created, the charging plan deriver 110 derives "comprehensive index components" associated with the charging plan, and derives a "comprehensive index" based on the "comprehensive index components". The "comprehensive index component" is a value obtained by multiplying the charging amount on the charging day and the maximum value of the "index" on the charging day and dividing the resultant by 100. The charging plan deriver 110 derives the "comprehensive index component" for each charging day. The "comprehensive index" is the sum of the "comprehensive index components" on the respective charging days.

As indicated by thick boxes in FIG. 11, the "comprehensive index component" on the charging day "October 10" is "7.2" by multiplying the charging amount "60" by the maximum value "12" of the "index" and dividing the resultant by 100 (60×12/100=7.2). The "comprehensive index component" on the charging day "October 13" is "6" by multiplying the charging amount "50" by the maximum value "12" of the "index" and dividing the resultant by 100 (50×12/100=6). As indicated by an arrow in FIG. 11, the "comprehensive index component" "7.2" on the charging day "October 10" and the "comprehensive index component" "6" on the charging day "October 13" are added together to derive a "comprehensive index" "13.2" (7.2+6=13.2).

Since the "comprehensive index" is derived based on the "indices", a higher value of the "comprehensive index" indicates a charging plan in which the user's orientation is reflected more greatly, the charging unit price is relatively low, and the disaster risk is low.

In the above description, October 10 is determined as the charging day as illustrated in FIG. 10 out of the two charging day candidates that are October 9 and October 10 indicated by the thick boxes in FIG. 9. In the example of FIG. 9, the charging day determination patterns may include a pattern for October 9 as well as that for October 10. When there are different charging days to determine, multiple charging plans in different patterns can be created.

FIG. 12 illustrates an example in which October 9 is determined as the charging day out of the two charging day candidates that are October 9 and October 10 indicated by the thick boxes in FIG. 9. As illustrated in FIG. 12, charging is performed on October 9 by a charging amount corresponding to an SOC "40" until the SOC changes from "50" to "90" (90−50=40).

As illustrated in FIG. 8, the "indices" on October 9 are "7.2", "7.2", "4.8", and "6". Since the maximum value of the "index" is "7.2", FIG. 12 illustrates "7.2" as the maximum value of the "index" on October 9. As illustrated in FIG. 8, the charging station 12 associated with the maximum value "7.2" of the "index" on October 9 is the charging station "A" or the charging station "B". Therefore, the charging station "A" or the charging station "B" is identified.

When the maximum value of the "index" is equal among multiple charging stations 12, one of the charging stations 12 may be identified based on a predetermined priority condition. For example, one of the charging stations 12 that is located relatively near the home may be identified with priority. The priority condition is not limited to the exemplified condition, and may be any other condition.

In the example of FIG. 12, the charging station "A" is identified out of the charging station "A" and the charging station "B" on October 9 based on the predetermined priority condition. That is, the charging plan deriver 110 determines the charging day as "October 9", and identifies the charging station "A" associated with the charging day.

When charging is performed on October 9, the SOC after the charging on October 9 is "90". Thus, the SOC transition after the charging on October 9 is updated as illustrated in FIG. 12.

For example, the SOC decrease amounts on October 10, October 11, and October 12 are "20", the SOC decrease amount on October 13 is "10", and the SOC decrease amount on October 14 is "30" as illustrated in FIG. 7. As illustrated in FIG. 12, the SOC on October 10 is estimated to be "70" by decreasing from "90" by "20". The SOC on October 11 is estimated to be "50" by decreasing from "70" by "20". The SOC on October 12 is estimated to be "30" by decreasing from "50" by "20". The SOC on October 13 is estimated to be "20" by decreasing from "30" by "10". On October 14, the SOC decreases from "20" by "30" into a negative value. When the value is negative, the SOC is estimated to be "0".

When the SOC transition is updated as illustrated in FIG. 12, the SOC "50" on October 11, the SOC "30" on October 12, and the SOC "20" on October 13 are in the range of 20 or more and 50 or less as indicated by thick boxes in FIG. 12. Thus, the charging plan deriver 110 sets October 11, October 12, or October 13 as the charging day.

For example, when October 13 is determined as the charging day, charging is performed on October 13 by a charging amount corresponding to an SOC "70" until the SOC changes from "20" to "90" (90−20=70) as illustrated in FIG. 13.

As illustrated in FIG. 8, the "indices" on October 13 are "7.2", "7.2", "12", and "6". Since the maximum value of the "index" is "12", FIG. 13 illustrates "12" as the maximum value of the "index" on October 13. As illustrated in FIG. 8, the charging station 12 associated with the maximum value "12" of the "index" on October 13 is the charging station "C". Therefore, FIG. 13 illustrates the charging station "C" on October 13. That is, the charging plan deriver 110 further determines the charging day as "October 13", and identifies the charging station "C" associated with the charging day.

When charging is performed on October 13, the SOC after the charging on October 13 is "90". Thus, the SOC transition after the charging on October 13 is updated as illustrated in FIG. 13.

For example, the SOC decrease amount on October 14 is "30" as illustrated in FIG. 7. As illustrated in FIG. 13, the SOC on October 14 is estimated to be "60" by decreasing from "90" by "30".

In the example of FIG. 13, the day that falls within the plan derivation period and is subsequent to October 13 determined as the latest charging day is not the day when the SOC is in the range of 20 or more and 50 or less. Thus, the charging plan deriver 110 no longer determines the charging day.

The charging plan deriver 110 creates a charging plan to perform charging at the charging station "A" on October 9 and at the charging station "C" on October 13.

After the charging plan has been created, the charging plan deriver 110 derives a "comprehensive index" associated with the charging plan.

As indicated by thick boxes in FIG. 13, the "comprehensive index component" on the charging day "October 9" is "2.88" by multiplying the charging amount "40" by the maximum value "7.2" of the "index" and dividing the resultant by 100 (40×7.2/100=2.88). The "comprehensive index component" on the charging day "October 13" is "8.4" by multiplying the charging amount "70" by the maximum value "12" of the "index" and dividing the resultant by 100 (70×12/100=8.4). As indicated by an arrow in FIG. 13, the "comprehensive index component" "2.88" on the charging day "October 9" and the "comprehensive index component" "8.4" on the charging day "October 13" are added together to derive a "comprehensive index" "11.28" (2.88+8.4=11.28).

In the manner described above, the charging plan deriver 110 can create multiple charging plans in different patterns. Although description is omitted, the charging plan deriver 110 can create a charging plan in a pattern in which October 12 is set as the charging day out of the two charging day candidates that are October 12 and October 13 in FIG. 10, as well as the pattern in which October 13 is set as the charging day in FIG. 11. Further, the charging plan deriver 110 can create a charging plan in a pattern in which October 11 or October 12 is set as the charging day out of the three charging day candidates that are October 11, October 12, and October 13 in FIG. 12, as well as the pattern in which October 13 is set as the charging day in FIG. 13.

The charging plan deriver 110 identifies the charging plan having the highest "comprehensive index" among the derived charging plans, and presents the identified charging plan to the user. For example, the charging plan deriver 110 presents the identified charging plan to the user by displaying the charging plan on the display device 70. The method for presenting the charging plan is not limited to this example, and may be any other method such as a method of outputting the charging plan by voice or sound.

As described above, the charging plan deriver 110 derives candidates for the charging plan to be presented to the user. The charging plan deriver 110 derives, for the respective candidates for the charging plan, the "comprehensive indices" indicating the priority levels of the candidates for the charging plan based on the charging amounts and the "indices" at the charging timings in the respective candidates for the charging plan. The charging plan deriver 110 determines the charging plan to be presented to the user based on the "comprehensive indices". The charging plan deriver 110 presents the determined charging plan to the user.

When the user's orientation is "with environmental preference", the charging plan deriver 110 basically derives a charging plan including the renewable energy charging station as the charging place. Even if the user's orientation is "with environmental preference", however, a charging plan including the non-renewable energy charging station may be derived because the value of the "index" of the renewable energy charging station decreases depending on, for example, influence of the disaster coefficient. That is, the charging plan deriver 110 presents, to the user, an appropriate charging plan while reflecting the user's orientation.

FIG. 14 is a flowchart illustrating an operation related to the derivation of the charging plan by the control device 56. The control device 56 executes a series of processes illustrated in FIG. 14 at a predetermined interrupt timing that comes in a predetermined cycle.

At the predetermined interrupt timing, the charging plan deriver 110 determines whether a charging plan derivation start condition is satisfied (S10). The charging plan deriver 110 determines that the charging plan derivation start condition is satisfied, for example, when a preset time in a day has passed. The condition is not limited to one day, and may be, for example, an elapse of two or three days or approximately the same period as the plan derivation period, such as one week. The charging plan derivation start condition is not limited to this example, and may be any other condition.

When the charging plan derivation start condition is not satisfied ("NO" in S10), the charging plan deriver 110 terminates the series of processes.

When the charging plan derivation start condition is satisfied ("YES" in S10), the charging plan deriver 110 sets the plan derivation period for the derivation of the charging plan (S11). For example, the charging plan deriver 110 sets the plan derivation period to a period corresponding to one week from the next day.

The charging plan deriver 110 reads the correlation information 82 from the storage device 54 (S12). The charging plan deriver 110 extracts candidate charging stations 12 (S13). For example, the charging plan deriver 110 sets the candidate charging stations 12 to the charging stations 12 included in the correlation information 82. The method for extracting the candidate charging stations 12 is not limited to this example, and may be any other method.

The weather forecast information acquirer 102 acquires, from the weather information server 60, weather forecast information in an area including the candidate charging stations (S14). The weather forecast information acquirer 102 acquires the weather forecast information for each day within the plan derivation period.

The SOC decrease amount estimator 104 estimates an SOC decrease amount for each day within the plan derivation period (S15).

The user's orientation information acquirer 106 acquires the user's orientation information 80 (S16). When the user's orientation information 80 is prestored in the storage device 54, the user's orientation information acquirer 106 reads the user's orientation information 80 from the storage device 54.

The order of execution of the acquisition of the weather forecast information (S14), the estimation of the SOC decrease amount (S15), and the acquisition of the user's orientation information 80 (S16) is not limited to the exemplified execution order, and may be any other order.

The index deriver 108 executes an index derivation process (S17). The index derivation process (S17) is a process for deriving the "indices" to be used for deriving the charging plan as described with reference to FIG. 8. The index derivation process (S17) is described later in detail.

The charging plan deriver 110 executes a charging plan derivation process (S18). The charging plan derivation process (S18) is a process for deriving the charging plan based on the "indices" derived in the index derivation process (S17). The charging plan derivation process (S18) is described later in detail.

The charging plan deriver 110 presents a processing result obtained through the charging plan derivation process (S18) to the user (S19), and terminates the series of processes. For example, the charging plan deriver 110 displays the derived charging plan on the display device 70.

Figure 15:
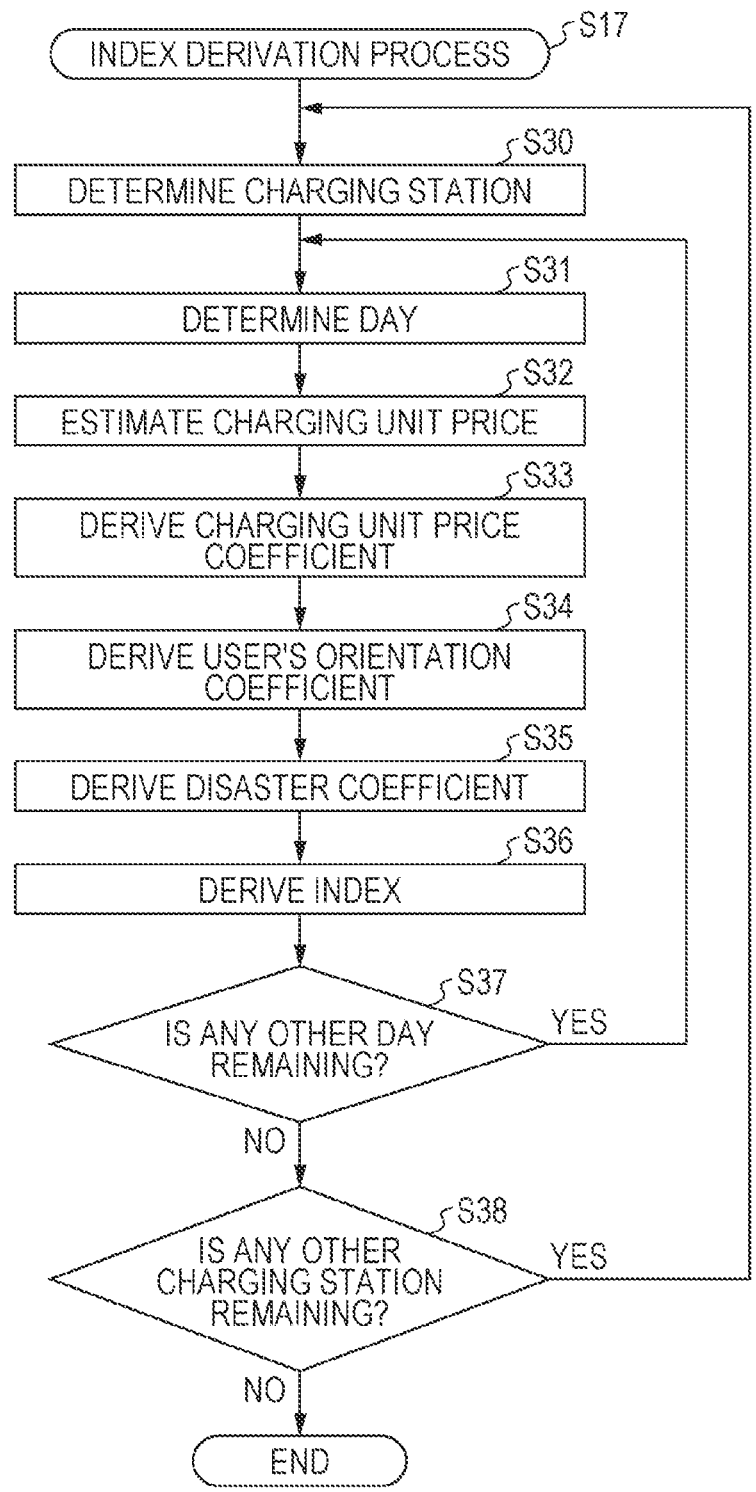
FIG. 15 is a flowchart illustrating a flow of an index derivation process.

FIG. 15 is a flowchart illustrating a flow of the index derivation process (S17). When the index derivation process (S17) is started, the index deriver 108 determines any charging station 12 out of the candidate charging stations 12 (S30). The charging station 12 determined in Step S30 may hereinafter be referred to as "index derivation target charging station 12".

The index deriver 108 determines any day within the plan derivation period (S31). The day determined in Step S31 may hereinafter be referred to as "index derivation target day".

The index deriver 108 refers to the correlation information 82 to estimate a charging unit price of the index derivation target charging station 12 on the index derivation target day based on the weather forecast information acquired in Step S14 (S32).

The index deriver 108 refers to the charging unit price coefficient table 86 to derive a charging unit price coefficient of the index derivation target charging station 12 on the index derivation target day based on the charging unit price of the index derivation target charging station 12 on the index derivation target day (S33).

The index deriver 108 refers to the user's orientation coefficient table 84 to derive a user's orientation coefficient of the index derivation target charging station 12 on the index derivation target day (S34). The index deriver 108 refers to the disaster coefficient table 88 to derive a disaster coefficient of the index derivation target charging station 12 on the index derivation target day (S35).

The index deriver 108 derives an "index" of the index derivation target charging station 12 on the index derivation target day by multiplying the charging unit price coefficient derived in Step S33, the user's orientation coefficient derived in Step S34, and the disaster coefficient derived in Step S35 (S36).

The index deriver 108 determines whether any other day when the derivation of the "index" of the index derivation target charging station 12 has not been completed is remaining within the plan derivation period (S37).

When any other day is remaining ("YES" in S37), the index deriver 108 returns to Step S31 to determine any remaining day (S31). Every time the day is determined in Step S31, the index deriver 108 repeats the processes up to the derivation of the "index" (S36) until no other day remains for the index derivation target charging station 12.

When no other day remains for the index derivation target charging station 12 ("NO" in S37), the index deriver 108 determines whether any other charging station 12 in which the derivation of the "index" has not been completed is remaining among the candidate charging stations 12 (S38).

When any other charging station 12 is remaining ("YES" in S38), the index deriver 108 returns to Step S30 to determine any remaining charging station 12 (S30). Every time the charging station 12 is determined in Step S30, the index deriver 108 repeats the processes up to the derivation of the "index" (S36) until no other charging station 12 remains.

When no other charging station 12 remains ("NO" in S38), the index deriver 108 terminates the index derivation process (S17).

Figure 16:
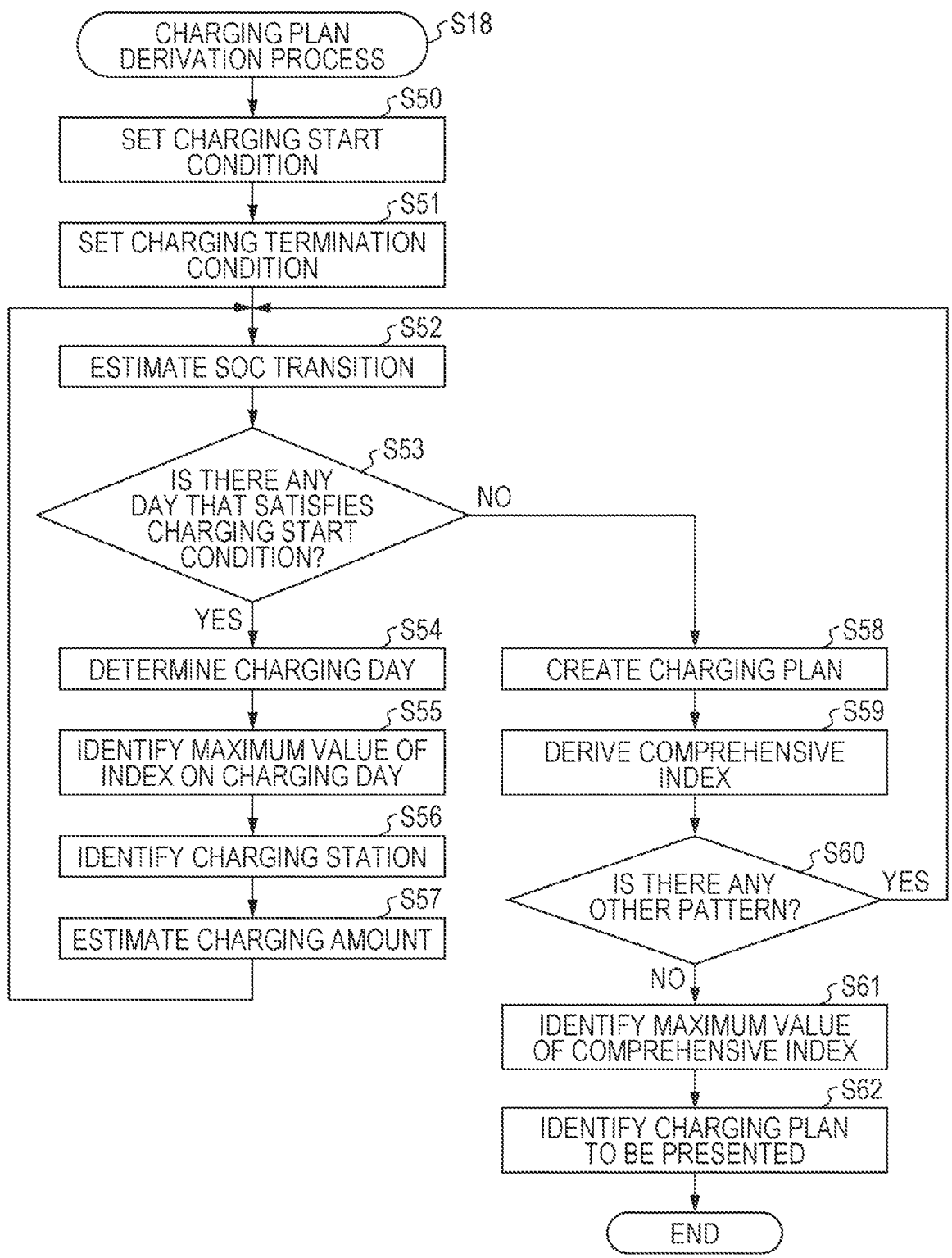
FIG. 16 is a flowchart illustrating a flow of a charging plan derivation process.

FIG. 16 is a flowchart illustrating a flow of the charging plan derivation process (S18). When the charging plan derivation process (S18) is started, the charging plan deriver 110 sets a charging start condition (S50). For example, the charging plan deriver 110 makes such a setting that the charging start condition is satisfied when the SOC is in a range of 20% or more and 50% or less. The charging start condition is not limited to this example, and may be set to any other SOC range.

The charging plan deriver 110 sets a charging termination condition (S51). For example, the charging plan deriver 110 makes such a setting that the charging termination condition is satisfied when the SOC has reached 90% or more. The charging termination condition is not limited to this example, and may be set to any other SOC.

The charging plan deriver 110 estimates an SOC transition in the plan derivation period based on the SOC decrease amounts derived in Step S15 (S52).

The charging plan deriver 110 determines, based on the estimated SOC transition, whether a day that satisfies the charging start condition is present among the days subsequent to the latest charging day (S53). When Step S53 is executed with Step S54 unexecuted, the charging plan deriver 110 makes the determination in Step S53 for the first day of the plan derivation period onward.

When the day that satisfies the charging start condition is present ("YES" in S53), the charging plan deriver 110 determines, as the charging day, any day that satisfies the charging start condition (S54).

The charging plan deriver 110 identifies the maximum value among the "indices" of the charging stations 12 on the determined charging day (S55). The charging plan deriver 110 identifies the charging station 12 associated with the maximum value of the "index" (S56). The charging plan deriver 110 estimates a charging amount of the identified charging station 12 on the determined charging day based on the SOC transition and the charging termination condition (S57).

The charging plan deriver 110 returns to Step S52 to estimate the SOC transition again under the assumption that charging is performed in the charging amount estimated in Step S57 on the charging day determined in Step S54 (S52). Thus, the SOC transition is updated.

After the SOC transition has been updated, the charging plan deriver 110 determines whether a day that satisfies the charging start condition is present among the days subsequent to the charging day determined in Step S54 (S53). When the day that satisfies the charging start condition is present ("YES" in S53), the charging plan deriver 110 determines, as another charging day, any day that satisfies the charging start condition (S54). That is, the second and subsequent charging days are determined by repeating Step S54.

When the day that satisfies the charging start condition is present among the days subsequent to the latest charging day, the charging plan deriver 110 determines a new charging day and updates the SOC transition. This process is repeated until the day that satisfies the charging start condition is no longer present among the days subsequent to the latest charging day.

When the day that satisfies the charging start condition is no longer present among the days subsequent to the latest charging day ("NO" in S53), the charging plan deriver 110 creates a charging plan based on the charging day determined in Step S54 and the charging station 12 identified in Step S56 (S58). When multiple charging days are determined in Step S54, the charging plan includes the charging days.

The charging plan deriver 110 derives a "comprehensive index" of the created charging plan based on the charging day and the charging amount in the created charging plan (S59).

When there are multiple days that satisfy the charging start condition in Step S53, there are multiple charging day candidates. When there are multiple charging day candidates, charging plans in all different patterns are created for the charging day candidates.

After Step S59, the charging plan deriver 110 determines whether there is any other pattern different from that of the charging plan created in Step S58 (S60). For example, the charging plan deriver 110 determines that any other pattern is present when there are multiple days that satisfy the charging start condition in Step S53 and there remains a day that has not been determined as the charging day among the multiple days.

When the charging plan deriver 110 determines that any other pattern is present ("YES" in S60), the charging plan deriver 110 repeats Step S52 and subsequent steps until no other pattern remains. Since the charging plan is created every time Step S58 is executed, charging plans in multiple patterns are generated.

When the charging plan deriver 110 determines that no other pattern remains ("NO" in S60), the charging plan deriver 110 identifies the maximum value of the "comprehensive index" based on the "comprehensive indices" of the charging plans (S61).

The charging plan deriver 110 identifies the charging plan associated with the maximum value of the "comprehensive index" as a charging plan to be presented to the user (S62), and terminates the charging plan derivation process (S18).

As described above, the charging management system 1 of this embodiment derives the charging plan in which the charging unit price is relatively reduced while reflecting the user's orientation based on the correlation information 82, the acquired weather forecast information, the estimated SOC decrease amount, and the acquired user's orientation information 80.

The derived charging plan includes the charging station 12 that appropriately reflects the user's orientation, that is, the driver's orientation. By actually performing the charging referring to the charging plan derived by the charging management system 1 of this embodiment, it is possible to perform charging based on the driver's orientation.

Although the embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

In the embodiment described above, the control device 56 of the vehicle 10 executes the process for generating the correlation information 82 and the various processes for deriving the charging plan. Alternatively, any computer outside the vehicle 10 may execute one or more of the process for generating the correlation information 82 and the various processes for deriving the charging plan.

In the embodiment described above, the user's orientation coefficient, the charging unit price coefficient, and the disaster coefficient are set so that the user's orientation is reflected more greatly as the user's orientation coefficient increases, the charging unit price decreases as the charging unit price coefficient increases, and the disaster risk decreases as the disaster coefficient increases. Alternatively, the user's orientation coefficient, the charging unit price coefficient, and the disaster coefficient may be set so that the user's orientation is reflected more greatly as the user's orientation coefficient decreases, the charging unit price decreases as the charging unit price coefficient decreases, and the disaster risk decreases as the disaster coefficient decreases. In this case, the charging plan deriver 110 presents, to the user, a charging plan in which the "index" and the "comprehensive index" decrease.

The control device 56 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 56 including the correlation information generator 100, the weather forecast information acquirer 102, the SOC decrease amount estimator 104, the user's orientation information acquirer 106, the index deriver 108, and the charging plan deriver 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A charging management system comprising:
a storage device configured to store correlation information on charging stations and pieces of weather information, the correlation information being information in which the charging stations, the pieces of weather information at timings at respective positions of the charging stations, and respective charging unit prices of the charging stations at the timings are associated with each other; and
a control device,
wherein the control device comprises:
one or more processors; and
one or more memories coupled to the one or more processors,
wherein, in the correlation information, information as to whether a source of power generation in each of the charging stations is renewable energy is associated with each of the charging stations, and
wherein the one or more processors are configured to
acquire weather forecast information indicating weather forecasts,
estimate amounts of future decrease in a state of charge of an onboard battery in a vehicle,
acquire user's orientation information indicating the user's orientation as to whether a user is oriented toward charging at a charging station using the renewable energy as the source of power generation, and
derive, based on the correlation information stored in the storage device, the acquired weather forecast information, the estimated amounts of decrease in the state of charge, and the acquired user's orientation information, a charging plan indicating a combination of a charging timing and a charging place in a future such that a charging unit price is relatively reduced while reflecting the user's orientation.

2. The charging management system according to claim 1, wherein the one or more processors are configured to
derive, based on the user's orientation information, user's orientation coefficients indicating respective weights to be assigned to the user's orientations,
estimate the charging unit prices of the charging stations based on the weather forecast information and derive, based on the estimated charging unit prices, charging unit price coefficients indicating respective weights to be assigned to the charging unit prices of the charging stations,
derive indices each including at least one of the user's orientation coefficients and one of the charging unit price coefficients, and
derive the charging plan based on the indices.

3. The charging management system according to claim 2, wherein the one or more processors are configured to
derive candidates for the charging plan to be presented to the user,
derive, for the respective candidates for the charging plan, comprehensive indices indicating priority levels of the candidates for the charging plan based on charging amounts and the indices at charging timings in the respective candidates for the charging plan, and
determine one of the candidates for the charging plan as the charging plan to be presented to the user based on the comprehensive indices.

4. The charging management system according to claim 1, wherein the one or more processors are configured to
extract one or more charging stations from the charging stations based on a passage route along which the vehicle has actually passed,
acquire the charging unit prices of the one or more charging stations at a specific timing,
acquire the pieces of weather information at the specific timing at the positions of the one or more charging stations, and
generate the correlation information by associating the one or more charging stations, the acquired charging unit prices, and the acquired pieces of weather information, and store the generated correlation information in the storage device.

5. The charging management system according to claim 2, wherein the one or more processors are configured to
extract one or more charging stations from the charging stations based on a passage route along which the vehicle has actually passed,
acquire the charging unit prices of the one or more charging stations at a specific timing, acquire the pieces of weather information at the specific timing at the positions of the one or more charging stations, and generate the correlation information by associating the one or more charging stations, the acquired charging unit prices, and the acquired pieces of weather information, and store the generated correlation information in the storage device.

6. The charging management system according to claim 3, wherein the one or more processors are configured to extract one or more charging stations from the charging stations based on a passage route along which the vehicle has actually passed, acquire the charging unit prices of the one or more charging stations at a specific timing, acquire the pieces of weather information at the specific timing at the positions of the one or more charging stations, and generate the correlation information by associating the one or more charging stations, the acquired charging unit prices, and the acquired pieces of weather information, and store the generated correlation information in the storage device.

* * * * *